United States Patent
Thoemmes et al.

(10) Patent No.: US 7,098,933 B1
(45) Date of Patent: Aug. 29, 2006

(54) ACQUIRING AND UNACQUIRING ALIGNMENT AND EXTENSION POINTS

(75) Inventors: Alexander Thoemmes, San Rafael, CA (US); Brett K. Bloomquist, Santa Rosa, CA (US)

(73) Assignee: Autodesk, Inc., San Rafael, CA (US)

( * ) Notice: Subject to any disclaimer, the term of this patent is extended or adjusted under 35 U.S.C. 154(b) by 1079 days.

(21) Appl. No.: 09/256,896

(22) Filed: Feb. 24, 1999

(51) Int. Cl.
*G09G 5/00* (2006.01)
*G06F 17/00* (2006.01)

(52) U.S. Cl. .................. 345/677; 715/856; 715/964
(58) Field of Classification Search ............. 345/862, 345/677; 715/862, 964, 856
See application file for complete search history.

(56) References Cited

U.S. PATENT DOCUMENTS

| | | | |
|---|---|---|---|
| 4,698,625 A * | 10/1987 | McCaskill et al. ......... 345/157 |
| 4,725,829 A * | 2/1988 | Murphy .................. 345/860 |
| 5,123,087 A * | 6/1992 | Newell et al. ............ 345/619 |
| 5,327,528 A * | 7/1994 | Hidaka et al. ............ 345/642 |
| 5,463,722 A * | 10/1995 | Venolia ................. 345/662 |
| 5,490,241 A | 2/1996 | Mallgren et al. .......... 345/440 |
| 5,513,309 A | 4/1996 | Meier et al. ............. 345/860 |
| 5,546,521 A * | 8/1996 | Martinez ................ 345/708 |
| 5,572,639 A | 11/1996 | Gantt .................... 345/651 |
| 5,581,672 A * | 12/1996 | Letcher, Jr. ............. 345/420 |
| 5,655,095 A * | 8/1997 | LoNegro et al. .......... 345/825 |
| 5,724,531 A * | 3/1998 | Miyashita et al. ........ 345/786 |
| 5,737,554 A * | 4/1998 | Epelman-Wang et al. .. 345/862 |
| 5,745,099 A * | 4/1998 | Blomqvist .............. 345/859 |
| 5,757,358 A * | 5/1998 | Osga .................... 345/157 |
| 5,793,377 A | 8/1998 | Moore .................. 345/619 |
| 5,798,752 A * | 8/1998 | Buxton et al. ........... 345/157 |
| 5,870,079 A * | 2/1999 | Hennessy ............... 345/157 |
| 6,031,531 A * | 2/2000 | Kimble ............... 340/825.19 |
| 6,337,703 B1 * | 1/2002 | Konar et al. ............ 345/858 |
| 6,480,813 B1 * | 11/2002 | Bloomquist et al. ........ 703/1 |
| 6,486,869 B1 * | 11/2002 | Nakano ................. 345/157 |

* cited by examiner

*Primary Examiner*—Ryan Yang
(74) *Attorney, Agent, or Firm*—Gates & Cooper LLP

(57) ABSTRACT

A method, apparatus, and an article of manufacture for acquiring and unacquiring data points of interest in a drawing program. Data points of interest are acquired after a display cursor is positioned over the data point of interest for an acquisition pause time. This technique presents the flashing of superfluous information on the display as the cursor passes over objects in the drawing. Embodiments are presented which implement alignment and extension of objects using acquired data points, and non-symmetric acquisition pause times and snap distances.

37 Claims, 12 Drawing Sheets

ACQUIRING AND UNACQUIRING ALIGNMENT AND EXTENSION POINTS

CROSS-REFERENCE TO RELATED APPLICATIONS

This application is related to the following co-pending and commonly assigned patent application, all of which applications are incorporated by reference herein:

Application Ser. No. 09/526,661, entitled "AUTOMATIC TRACKING OF TEMPORARY POINTS," filed on same date herewith, by Brett K. Bloomquist and Alexander Thoemmes; and Application Ser. No. 09/526,664, entitled "RELATIVE POLAR ANGLE SNAP TOOL," filed on same date herewith, by Alexander Thoemmes and Brett K. Bloomquist.

BACKGROUND OF THE INVENTION

1. Field of the Invention

The present invention relates to computer-implemented systems and methods for drawing images, and in particular to a computer-aided drafting tool for acquiring and unacquiring alignment and extension points on existing drawing objects.

2. Description of the Related Art

Computer Aided Design (CAD) and other drawing programs allow the preparation and editing of machine drawings, schematic drawings, and artwork. Typically, the user creates these drawings with the use of a library of objects and a number of drawing tools. These drawing tools allow the user to define and edit lines, polygons, ovoids, and other objects.

One useful feature in such drawing programs is the ability to extend an existing object or line or to align two or more objects. In the case of extending an existing object or line, this is typically accomplished by selecting an extension point from a group of interesting points on the object, and manipulating a cursor to define the extension. In the case of alignment, this can be accomplished by selecting the objects to be aligned, and invoking an alignment command. Alternatively, alignment may be accomplished by acquiring one or more alignment points on existing objects to define alignment lines, then grabbing and moving objects within a snap distance of the alignment lines. When the objects are released, they snap into alignment with the alignment points defined on the existing objects. In some cases, the user may desire to align objects in accordance with one or a number of different interesting points known as alignment or reference points on the object. For example, the user may want to align an endpoint of a first line with a midpoint of a second line so that the endpoint and the midpoint have the same x-coordinate.

In either case, the alignment or extension of objects requires the user to select alignment or extension points on the object. Typically, the set of interesting points on an object is a subset of the points describing the shape of the object. For example, for a linear object, the set of interesting points typically comprises the two endpoints and a mid point, but does not include all of the data points in between. Since not all points on an object are available for alignment and/or extension purposes, drawing programs typically acquire and display interesting points on the object as the user moves the cursor over the object. Some drawing programs also require that the user move the cursor within a specified distance of the interesting point before acquisition takes place, and others show the interesting point when the cursor is along an alignment or extension path.

One of the problems with the current implementations of align and extend functionality is that as the user moves the cursor from one place on the drawing to another on the display, a large number of extension lines and interesting points flash about on the screen. This flashing problem is not only distracting, it can make it difficult to see the points the user is truly interested in, and can unnecessarily add to the computational burden of the computer hosting the drawing program. What is needed is a method of acquiring and unacquiring interesting points which solves this flashing problem. The present invention satisfies that need.

SUMMARY OF THE INVENTION

To address the requirements described above, the present invention discloses a method, apparatus, and an article of manufacture for acquiring a data point of interest on a displayed object.

The method comprises the steps of accepting a command to move a cursor near the data point, and acquiring the data point after the cursor remains near a data point for an acquisition pause time. If desired, the data point can be annotated to indicate when the data point has been acquired. After the data point has been acquired, the object can be extended or aligned with another object via a second acquired data point.

The method can be practiced in several embodiments. In one embodiment, the pause time is a user-selectable time designated in advance. After acquisition, the data point can be unacquired in several ways. In one embodiment, the data point can be unacquired if the cursor remains near the data point for an unacquisition pause time after the data point has been acquired. In another embodiment, the data point is unacquired by moving the cursor away from the data point, and again moving the cursor near the data point for the unacquisition pause time.

The apparatus comprises means for accepting a command to move a cursor near a data point of interest, and means for acquiring the data point after the cursor remains near the data point for an acquisition pause time. The article of manufacture comprises a data storage device tangibly embodying instructions to perform the method steps described above.

The foregoing allows the user to navigate a complex drawing with many objects and linear entities in search of a particular point of interest without the distraction of acquiring uninteresting points in between.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
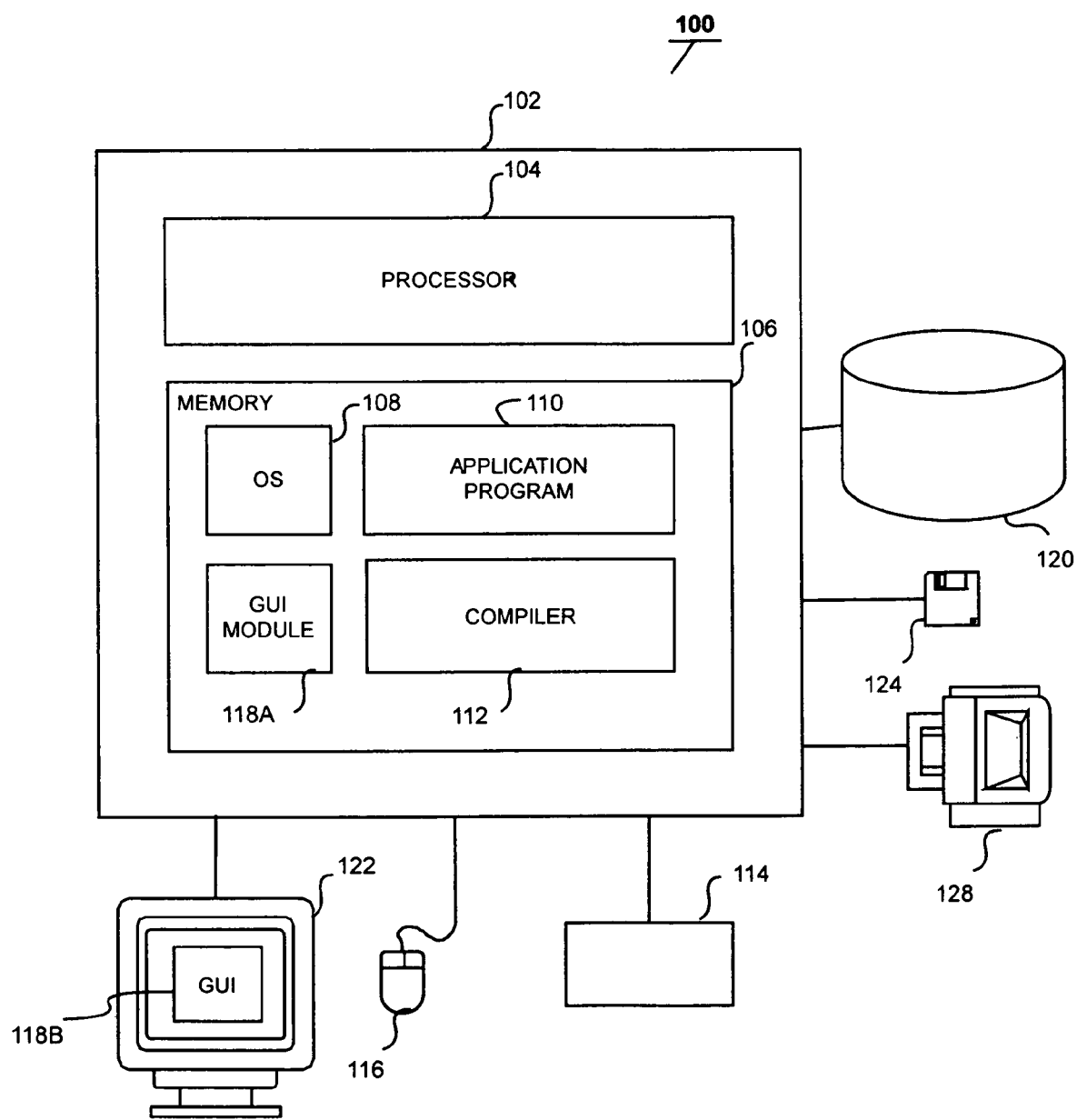
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the application program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the processor 104, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Acquiring and Unacquiring Data Points of Interest

FIGS. 2A–2F are flow charts illustrating operations used to acquire and unacquire data points of interest on a linear entity. The operations described in FIGS. 2A–2F will be discussed in connection with the illustrative examples provided in FIGS. 3A–3F, which show the acquisition of an endpoint 303A and a midpoint 303B (collectively referred to hereinafter as data points 303) on a first object 302A and a second object 302B (collectively referred to hereinafter as objects 302) and the alignment of the first 302A and second object 302B according to the acquired endpoint 303A and midpoint 303B.

Figure 2A:
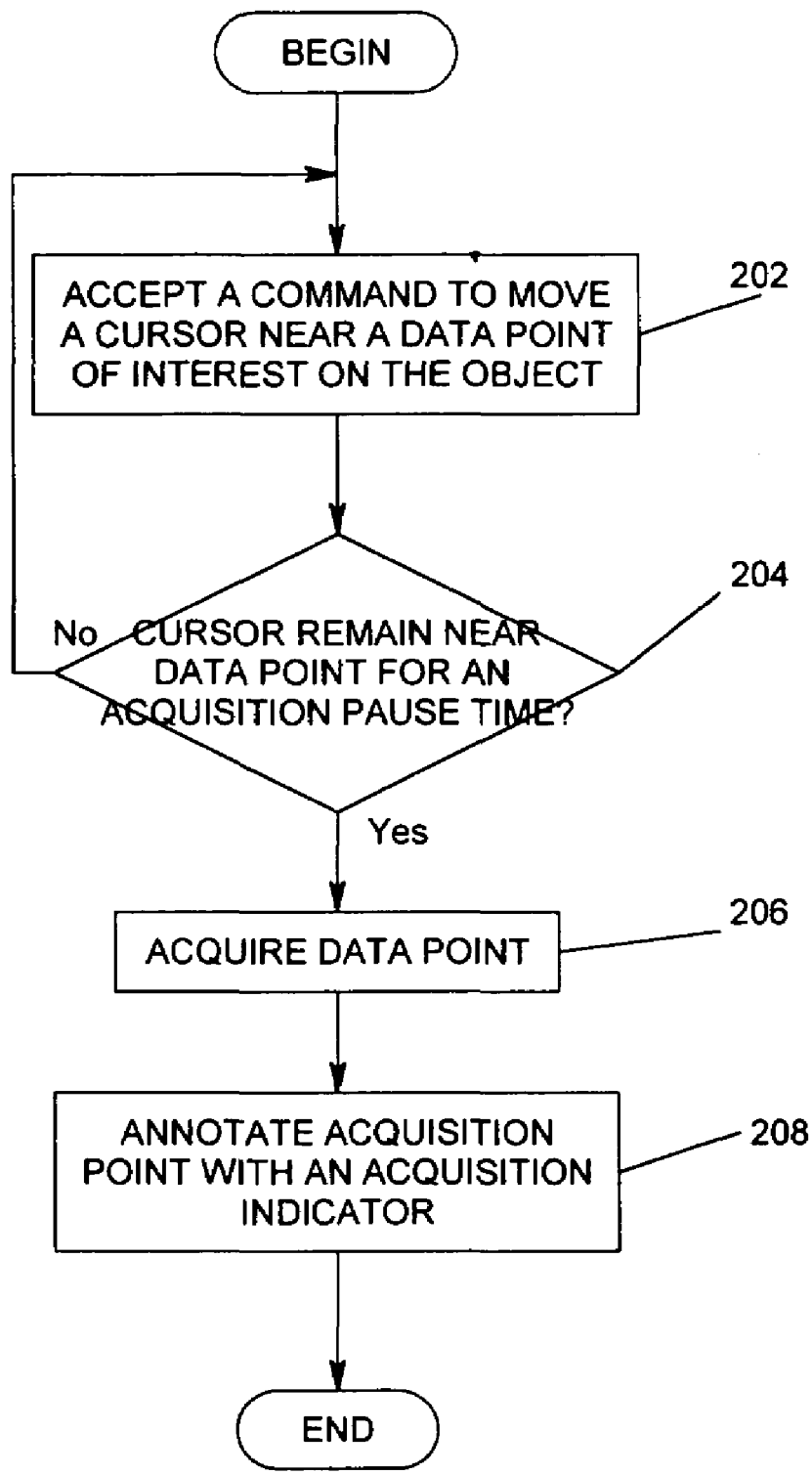
FIG. 2A is a flow chart presenting an illustrative example of operations used in the acquisition of interesting data points on an object.

FIG. 2A is a flow chart presenting an illustrative example of the operations used in the acquisition of interesting data points on an object. The process begins by accepting a command to move a cursor 304 near a data point 303 of interest on an object 302. This is depicted in block 202 of FIG. 2A and in FIGS. 3A and 3B. Block 204 determines if the cursor 304 has moved to and remained near (within an acquisition distance of) the data point 303 for an acquisition pause time. Exemplary operations performed to determine if the cursor 304 has moved to and remained near the data point 303 for the acquisition pause time are illustrated in FIG. 2F, the discussion of which is deferred until later in this disclosure.

The data point can be, for example, an endpoint or a midpoint of a line or arc; the center of an arc or a circle; a node (defined by a point placed overlapping joints or attachment locations); a closest quadrant point of an arc or a circle (the 0°, 90°, 180° and 270° points on a circle or arc); intersection of two lines, a line with an arc or a circle, or two circles and/or arcs; the insertion point of a shape, text, attribute, or attribute definition; a point on a line, circle or arc that forms a normal from that object; or a point on a circle or arc that forms a line tangent to the object.

Figure 3A:
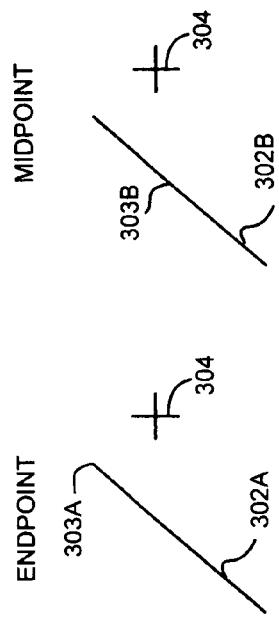
FIG. 3A is a diagram showing a linear entity before alignment or extension.
Figure 3B:
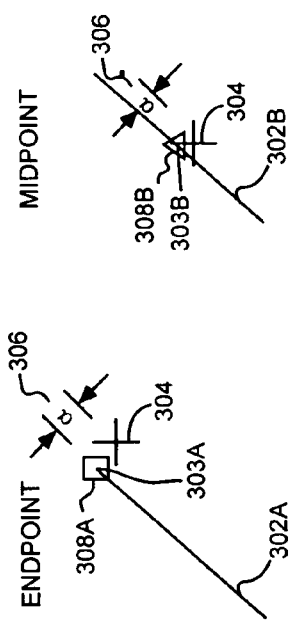
FIG. 3B is a diagram showing the acquisition of a data point wherein the cursor need be within an acquisition distance for the acquisition process to commence.

FIG. 3B shows an embodiment of the present invention in which the proximity between the data point 303 and the cursor 304 is determined as the shortest distance α 306 to the object 302, and the acquisition process begins when the measured distance α 306 is less than the acquisition distance. The acquisition distance can be user-selectable and can be adaptively determined according to the magnification of the view of the objects 302 presented on the display 122, the size and type of object 302, or other parameters. If the cursor does not remain near the data point 303 (within the acquisition distance) for the acquisition pause time, the logic returns to block 202 to wait for another command to move the cursor 304. If the cursor remains near the data point 303 for an acquisition pause time, the data point is acquired 206.

In one embodiment of the invention, the acquired data point 303 is annotated with an acquisition indicator 308, as shown in block 208. For convenience, the shape, color, or other attribute of the acquisition indicator 308 can be changed to reflect a characteristic of the acquired data point 303. For example, in the embodiment illustrated in FIG. 3B, a square acquisition indicator 308A is used to denote the acquisition of an endpoint 303A, and a triangular acquisition indicator 308B is used to denote the acquisition of a midpoint 303B.

Figure 3C:
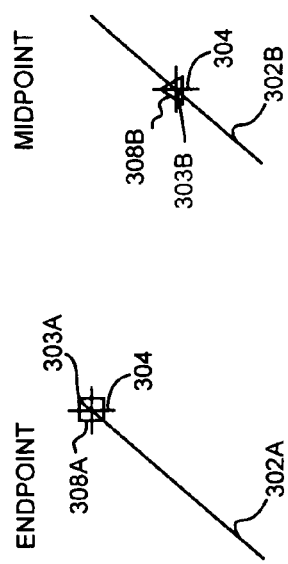
FIG. 3C is a diagram showing the acquisition of a data point wherein the cursor need be placed directly over the data point for the acquisition process to commence.

FIG. 3C is a diagram showing another embodiment of the present invention in which acquisition of the data point 303 occurs when the cursor 304 is paused directly over the data point 303 of interest.

Figure 3D:
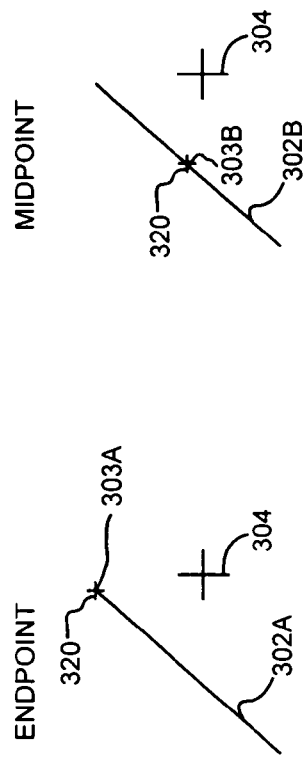
FIG. 3D is a diagram showing the annotation of the data point after acquisition and after the cursor is moved away from the acquisition point.

After the data point 303 is acquired, the user can then proceed to perform other drawing program operations by moving the cursor 304 away from the acquired data point 303, as shown in FIG. 3D. A data point marker 320 indicates the position of the acquired data point 303 after the cursor 304 is moved away from the object 302.

A modifier such as a shift key can be used to override the definition of the automatic acquisition of data points 303. For example, the present invention can be implemented so that data points 303 are not acquired when a modifier such as a shift key is depressed. This allows the user to move the cursor 304 to any position on the display and leave it there as long as is desired without acquiring a data point 303. This feature may useful in applications where there may be multiple data points 303 close together in one area.

Alternatively, the present invention can also be implemented so that data points 303 are only acquired when a modifier such as a shift key is depressed. In this way, the user can freely move the cursor 304 about the drawing without the flashing problem described above by doing so without depressing the modifier key. Then, when the user wants to scan about the drawing to acquire a data point of interest, the shift key can be depressed, and the cursor 304 can be moved to the desired data point, where acquisition can commence. This can be implemented with or without including the acquisition or unacquisition pause time described above. Although this technique requires additional keystrokes, it allows an experienced user to selectively acquire and unacquire data points 303 without waiting for the acquisition pause time.

Unacquiring Data Points

Figure 2B:
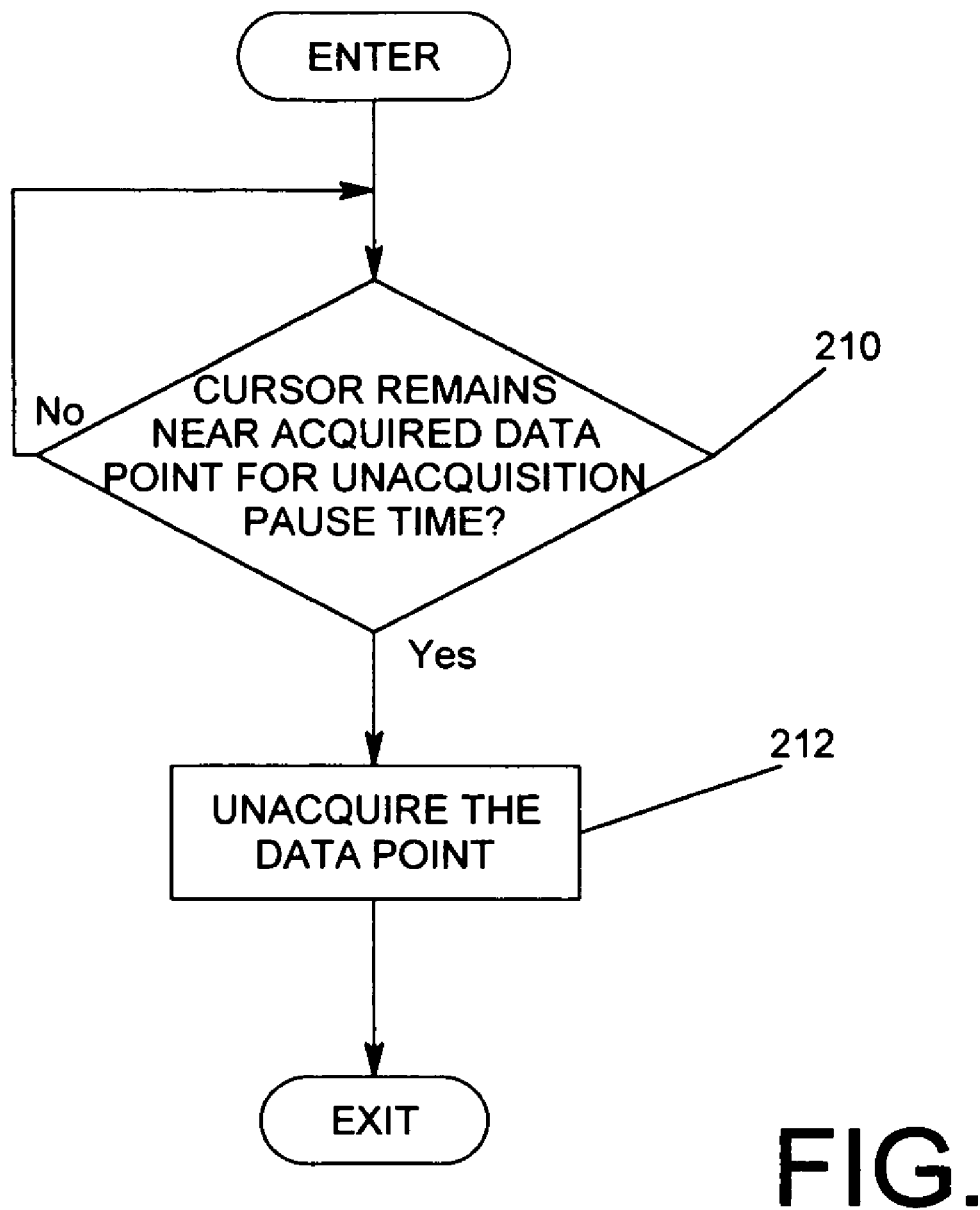
FIG. 2B is a flow chart presenting an illustrative example of operations used in unacquiring an acquired data point.

FIG. 2B is a flow chart illustrating the unacquisition of an acquired data point according to one embodiment of the present invention. After the data point 303 has been acquired, a check is made to determine if the cursor 304 remained near the acquired data point 303 for an unacquisition pause time. If not, the data point 303 remains acquired. If the cursor 304 has remained near the acquired data point 303 for the unacquisition pause time, the data point is unacquired 212. Hence, in this embodiment, the acquired data point 303 will be unacquired if the cursor 304 remains near the acquired data point 303 for an unacquisition pause time (which may be set to a different value than the acquisition pause time).

Figure 2C:
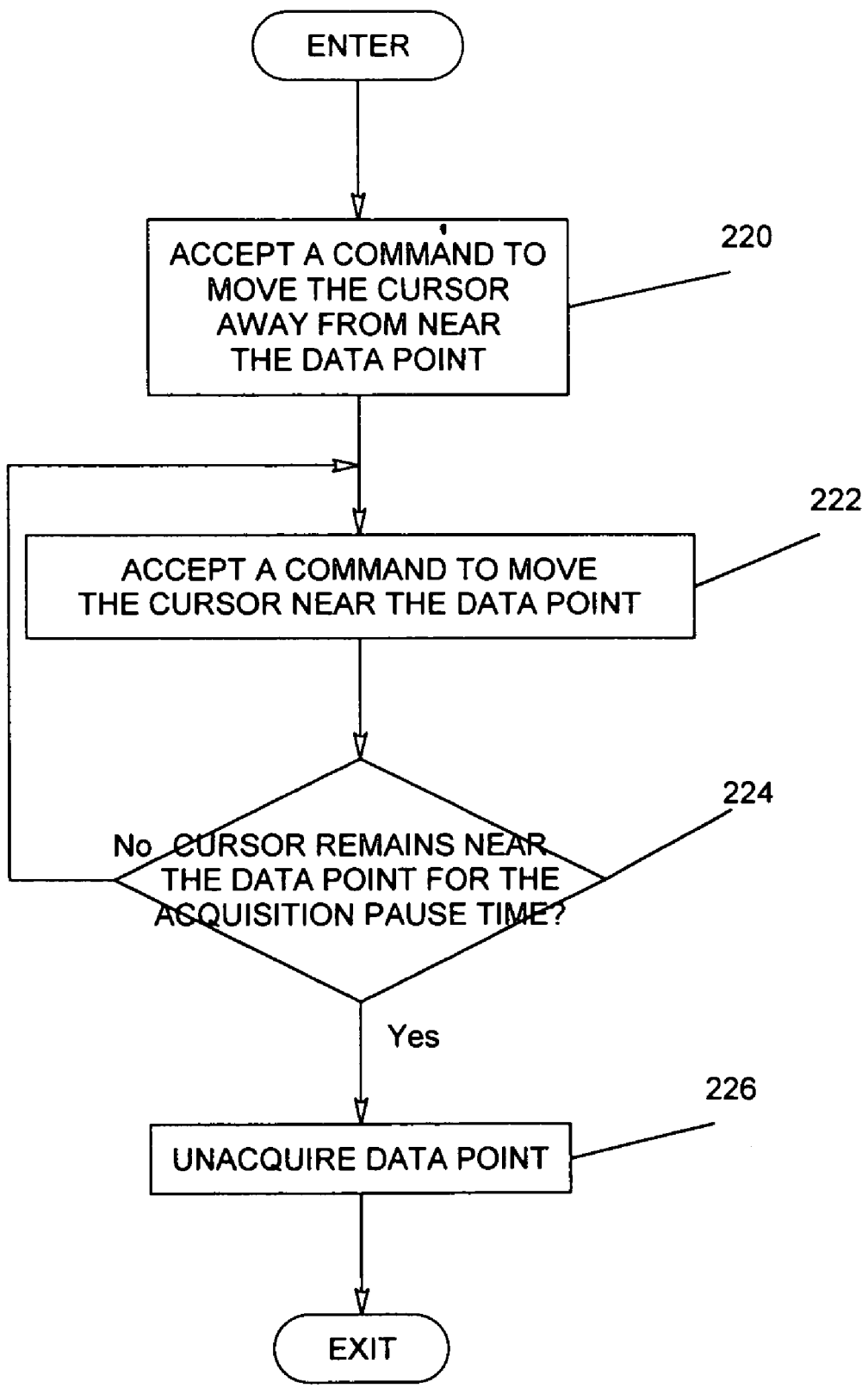
FIG. 2C is a flow chart presenting another illustrative example of operations used in unacquiring an acquired data point.
Figure 3E:
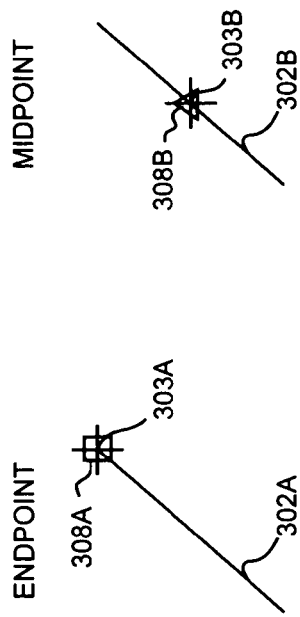
FIGS. 3E–3F are diagrams showing the unacquisition of acquired data points.
Figure 3F:
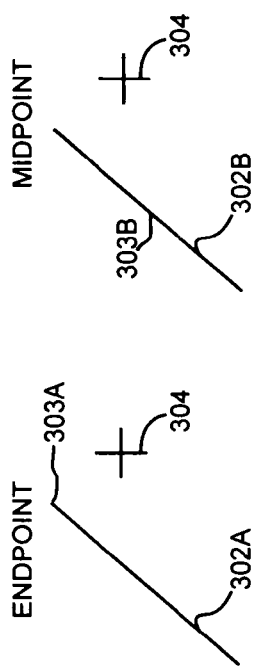

FIG. 2C is a flow chart presenting the unacquisition of an acquired data point according to another embodiment of the present invention. This embodiment is further illustrated in FIGS. 3D–3F. After the data point 303 has been acquired, a command is accepted 220 to move the cursor 304 away from near the data point 303, as illustrated in FIG. 3D. Then, a command is accepted 222 to again move the cursor near or over the data point 303, as shown in FIG. 3E. Block 224 of FIG. 2C then checks to determine if the cursor remained near the data point 303 for an unacquisition pause time. If so, the data point 303 is unacquired 226 and the data point marker 320 is removed, as shown in FIG. 3F.

It is important to note that the unacquisition of data points described above does not depend on the order in which the data points were acquired. Hence, any acquired data point can be unacquired in any order desired.

Aligning Objects Based on Acquired Data Points

Figure 2D:
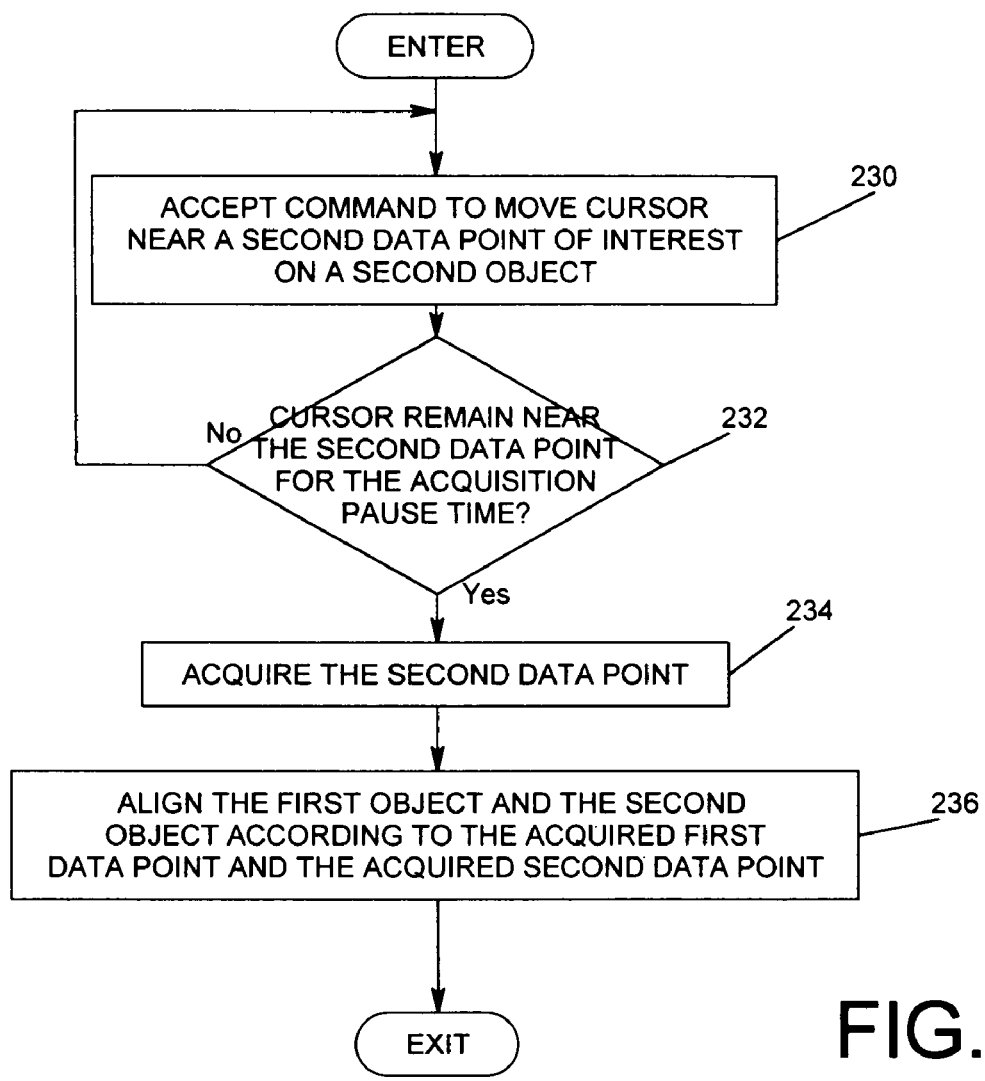
FIG. 2D is a flow chart presenting an illustrative example of operations used in aligning two objects.

FIG. 2D is a flow chart presenting an illustrative example of operations used to acquire a second data point 303B on a second object 302B and align that second object 302B to the first object 302A according to the acquired data points 303A and 303B on each object. Using the procedures previously described, a first data point 303A on a first object 302A is acquired. Then, a command is accepted to move the cursor 304 near a second data point 303B on a second object 302B, as shown in block 230. Block 232 checks to determine if the cursor 304 remained at or near the second data point 303B for the acquisition pause time. If not, logic returns to block 230, which awaits another cursor 304 input command. If the cursor remains at or near the second data point 303B on the second object 302B for the acquisition pause time, the second data point is acquired, as shown in block 234. Then, the first object 302A and the second object 302B are aligned in accordance with the first acquired data point 303A (which is an endpoint), and the second acquired data point 303B (which is a midpoint).

Figure 4:
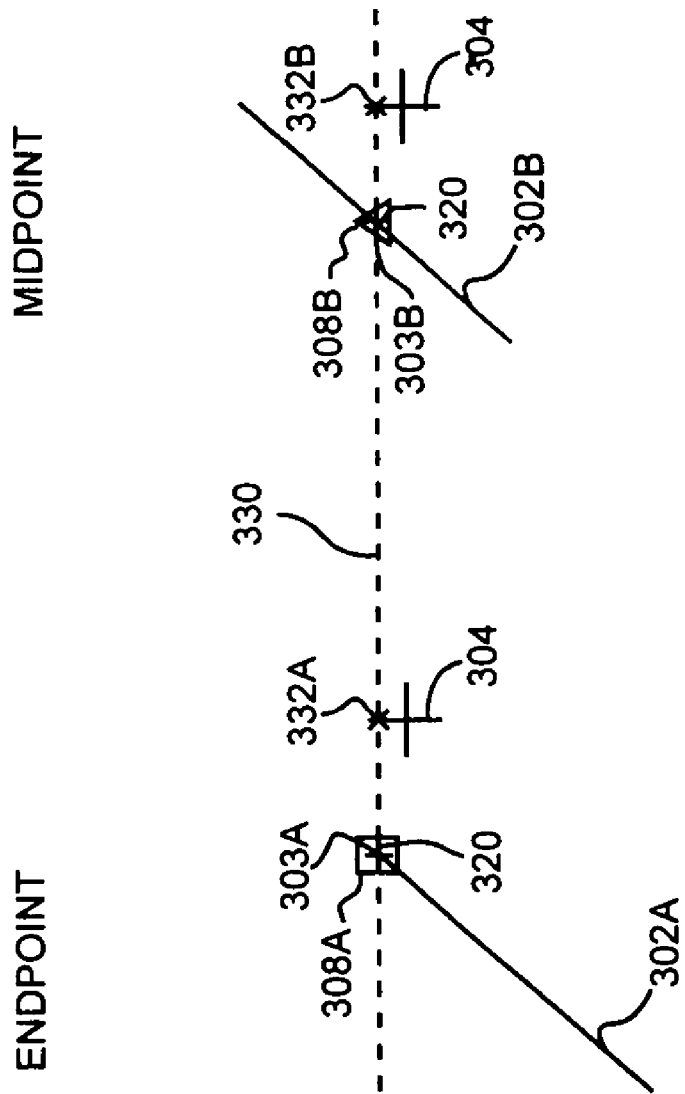
FIG. 4 is a diagram showing the alignment of existing objects according to acquired data points.

FIG. 4 is a diagram showing the alignment of a first object 302A with a second object 302B according to a first data point 303A on the first object 302A and a second data point 303B on the second object 302B. After acquiring the first data point 303A and the second data point 303B, an alignment command or function is invoked. This displays an alignment path 330, which indicates how the first object 302A and the second object 302B will be aligned. In the embodiment illustrated in FIG. 4, the first object 302A and the second object 302B are aligned so that the first data point 303A and the second data point 303B have the same x-coordinate (i.e., they lie along the same horizontal line). The first and second data points can be aligned so that the acquired data points share the same y-coordinate, and are thus vertically aligned. The present invention can also be used to practice other alignment schemes as well. For example, the alignment path 330 can be constrained to be a member of a set of lines radially extending from the first data point 303A, which snap into view when the cursor 304 is within a pre-definable distance from each radial line.

Figure 5A:
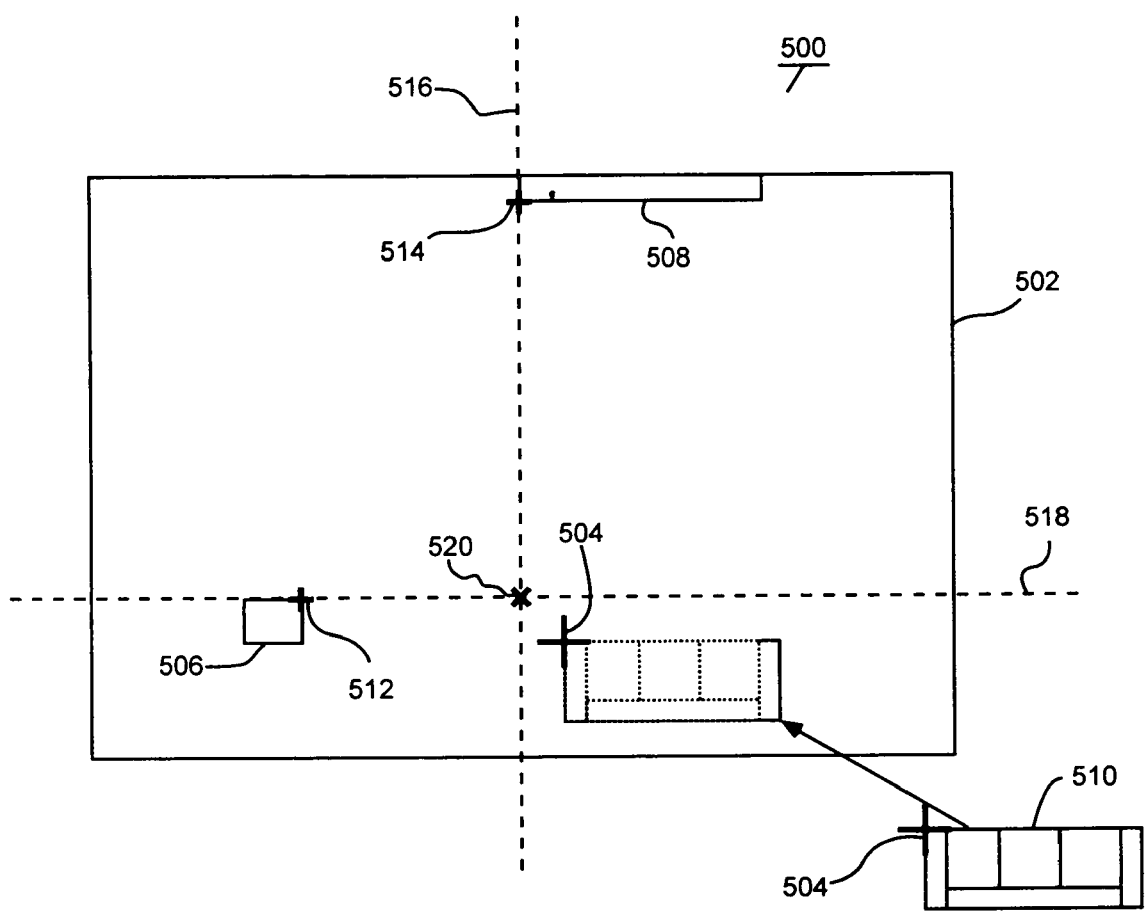
FIGS. 5A–5B are diagrams showing another technique to align objects.

FIG. 5A is a diagram showing another technique to align objects. The diagram 500 includes a representation of a room 502, with a vertical beam 506 and a window 508. Using the technique outlined above, a vertical beam alignment point 512 has been defined for the vertical beam 506, and a window alignment point 514 has been defined for the window 508. Vertical beam alignment path 518 is displayed when the y-coordinate of the cursor 504 is moved within a snap distance of the y-coordinate of the vertical beam alignment point 512. Window alignment path 516 is displayed when the x-coordinate of the cursor 504 is moved within a snap distance of the x-coordinate of the window alignment point 514. As illustrated in FIG. 5A, both the vertical beam alignment path 518 and the window alignment path 516 is displayed when the cursor 504 is within a snap distance of the y-coordinate of the vertical beam alignment point 512 and within a snap distance of the x-coordinate of the window alignment point 514. A secondary cursor 520 is presented where the vertical beam alignment path and the window alignment path intersect.

Using by manipulating the mouse 116 buttons to move the cursor 504, the user can select an object such as a representation of a couch 510. When the cursor 504 is then moved within a snap distance of the respective x and y-coordinates of the window alignment point 514 and the vertical beam alignment point 512, the respective window alignment path 516 and the vertical beam alignment path 518 are displayed. When the user releases the mouse 116 button, the couch 510 will be aligned with the displayed alignment paths.

Figure 5B:
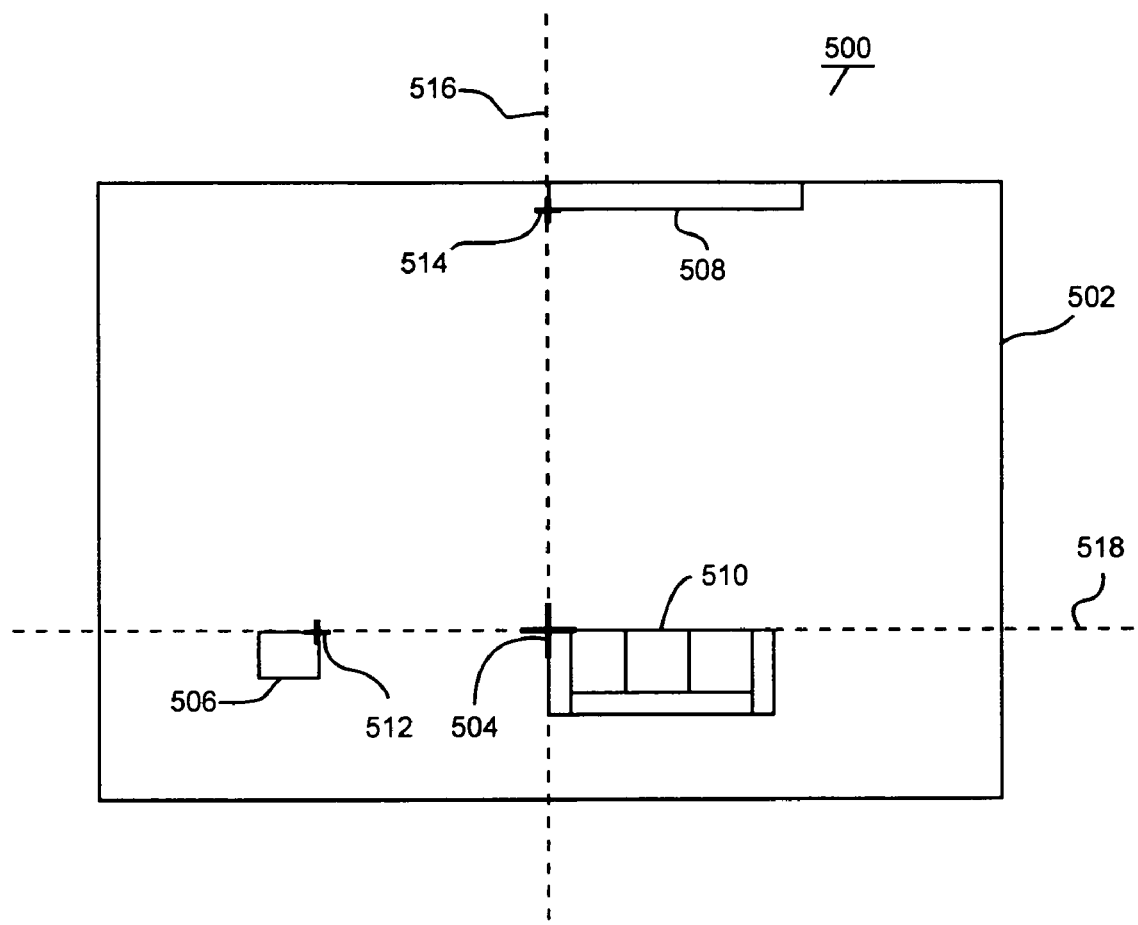

The object may be aligned in several ways. In one embodiment, the object is aligned in accordance with an alignment point that was acquired somewhere on the object. For example, an alignment point can be defined on the upper left corner of the couch 510 illustrated in FIG. 5A, and the couch may be aligned so that the alignment point is superimposed over the secondary cursor 520 as shown in FIG. 5B.

In another embodiment, the object is aligned according to the cursor position and the nearest edge of the object. For example, if the couch 510 is moved so that the vertical beam alignment line 518 and the window alignment line 516 are displayed (the cursor position is within the respective snap distances), and the cursor is within the lower right quadrant formed by the vertical beam alignment line 518 and the window alignment line 516, the couch 510 is aligned so that the top and left edges of the couch 510 are superimposed on the vertical beam alignment line and the window alignment line, respectively. If the cursor is within the upper right quadrant, the couch 510 is aligned so that the bottom and left edges of the couch 510 are superimposed on the vertical beam alignment line 518 and the window alignment line 516, respectively.

Using the above teaching, other alignment techniques can also be used. For example, the determination of which edge of the object should be superimposed on the respective alignment line can be based on the position of the center of the object to be aligned, instead of the cursor position as described above.

Extending Objects Using Acquired Data Points

Figure 2E:
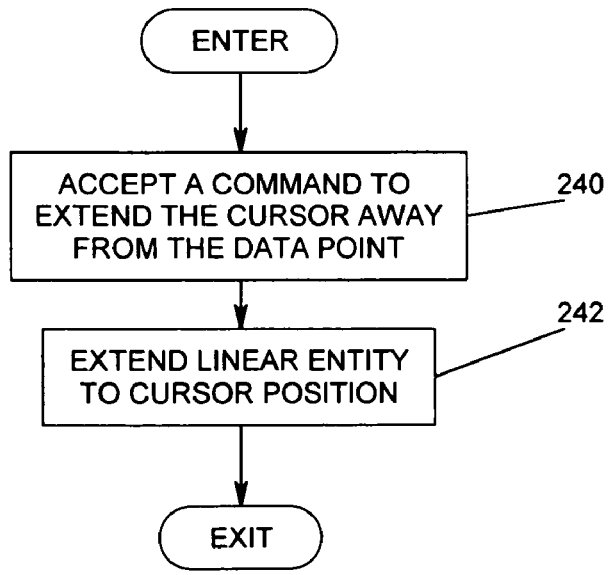
FIG. 2E is a flow chart presenting an illustrative example of operations used in extending a linear entity.
Figure 2F:
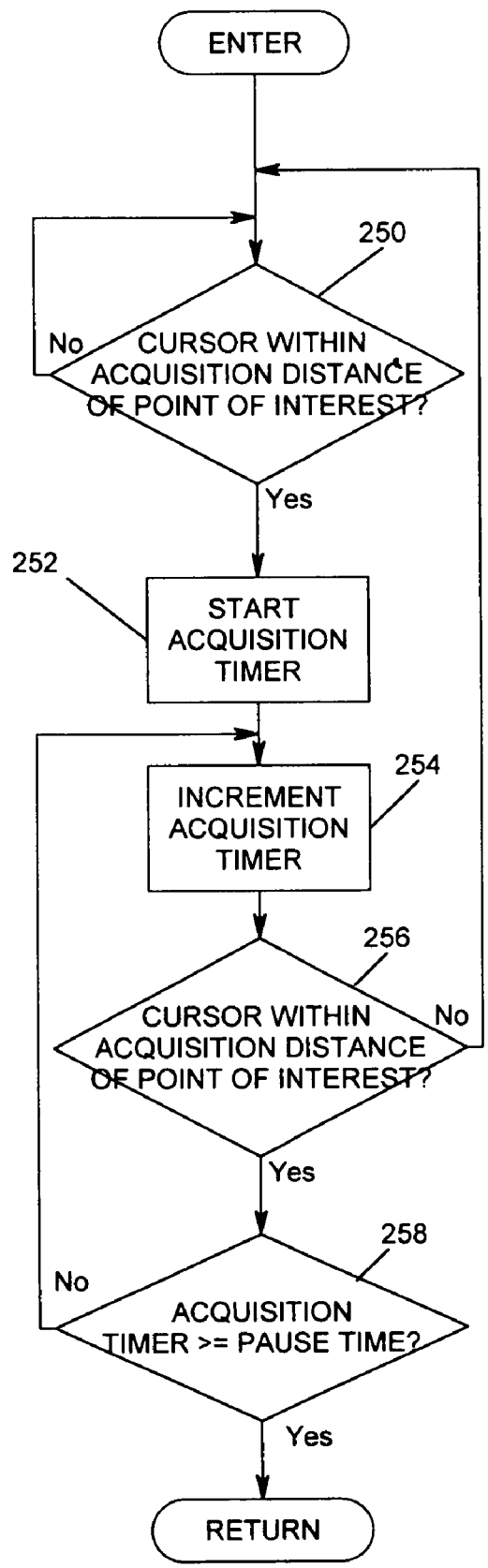
FIG. 2F is a flow chart presenting an illustrative example of operations used to determine if the cursor remains near the data point for an acquisition pause time.

FIG. 2E is a block diagram illustrating the use of the present invention to acquire a data point of interest to extend an object such as a linear entity. Using the procedures previously described, a first data point 303A on a first object 302A is acquired. Then, a command is accepted 240 to extend the cursor 240 away from the acquired data point, as shown in block 242.

In the illustrated embodiment, the linear entity is a line 302, but this need not be the case. The linear entity can also be a linearly representable attribute of a wide variety of objects. For example, the linear entity could be the major or minor axis of an elliptically shaped object. Similarly, the linear entity can be a tangent of an arc or a circle at a selected point (for example, the mid-point of an arc), or one of the sides of a multi-sided polygon.

Figure 6:
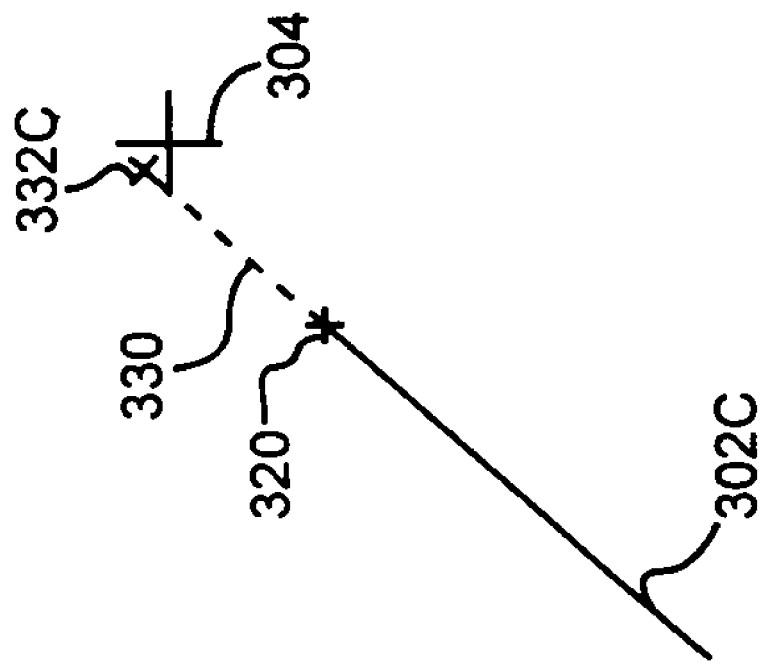
FIG. 6 is a diagram showing the extension of a linear object.

FIG. 6 is a diagram showing an illustrative example of the use of the present invention to extend a linear entity. After the data point has been acquired using the method outlined above, an alignment function is invoked, and the cursor 304 is moved away from the acquired data point 320. This displays an alignment path 330, which indicates how the linear entity 302C will be extended. As was described above, the alignment path can be one of a set of candidate alignment paths that are snapped to when the cursor 304 enters within a pre-settable distance. The length of the linear entity 302C is then defined by the position of the cursor 304 relative to the nearest point on the linear entity 302C, as delineated by indicator 332C. The length of the line extension can be determined as a member of a set of lengths as well, which snap into position when the cursor is within a pre-settable distance from one of the set. The extension operation can be completed by depressing a mouse 116 button or by other command with the cursor 304 at the proper position.

Determining When the Cursor is Near the Data Point for an Acquisition Pause Time FIG. 2F is a flow chart illustrating the operations performed to determine if the cursor 304 has moved to and remained near the data point 303 for an acquisition pause time. First, block 250 determines if the cursor 304 is within the acquisition distance of a point of interest. If so, an acquisition timer is started, as shown in block 252. The acquisition timer is incremented and a check is made to determine if the cursor is still within the acquisition distance of the point of interest. This is depicted in blocks 254 and 256. If the cursor is not within the acquisition distance of the point of interest (it has moved), logic returns to block 250. If the cursor remains within the acquisition distance of the point of interest, a check is made to determine if the incremented acquisition timer has reached the acquisition pause time, as shown in block 258. If the acquisition timer has not reached the acquisition pause time, logic returns to block 254. If the acquisition timer has reached the acquisition pause time, the cursor 304 has entered and remained within the acquisition distance of the data point of interest, and the logic is completed.

CONCLUSION

This concludes the description of the preferred embodiments of the present invention. In summary, the present invention describes a method, apparatus, and article of manufacture for acquiring and unacquiring data points of interest.

The method comprises the steps of accepting a command to move a cursor near the data point, and acquiring the data point after the cursor remains near a data point for an acquisition pause time. If desired, the data point can be annotated to indicate when the data point has been acquired. After the data point has been acquired, other objects can be aligned in relation to the acquired data point.

The method can be practiced in several embodiments. In one embodiment, the pause time is a user-selectable time designated in advance. After acquisition, the data point can be unacquired in several ways. In one embodiment, the data point can be unacquired if the cursor remains near the data point for an unacquisition pause time after the data point has been acquired. In another embodiment, the data point is unacquired by moving the cursor away from the data point, and again moving the cursor near the data point for the unacquisition pause time.

The apparatus comprises means for accepting a command to move a cursor near a data point of interest, and means for acquiring the data point after the cursor remains near the data point for an acquisition pause time. The article of manufacture comprises a data storage device tangibly embodying instructions to perform the method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching.

For example, non-symmetric acquisition pause times and acquisition distances can be implemented to make the invention more user friendly. For example, the acquisition distance can be selected (by the user or otherwise) to be a small value when the cursor first encounters the data point (e.g. the first few counts of the acquisition timer), and a larger distance thereafter. This would result in a more selective acquisition of the data point of interest, yet still tolerate extraneous cursor motion after the first few counts of the acquisition timer. Further, the acquisition pause time can be user-settable to a higher value than the unacquisition pause time or vice-versa.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of acquiring a data point of interest on a drawing object, comprising the steps of:
   accepting a command to move a cursor near the data point of interest on the drawing object in a computer-implemented drawing program; and
   acquiring the data point after the cursor remains near the data point for an acquisition pause time.

2. The method of claim 1, wherein the pause time is user-selectable.

3. The method of claim 1, wherein the object is a linear entity.

4. The method of claim 3, further comprising the step of accepting a command to move the cursor away from the data point to extend the linear entity.

5. The method of claim 1, wherein the data point is selected from a group comprising:
   an endpoint;
   a midpoint;
   a node;
   a closest quadrant point;
   an insertion point;
   a point on a line tangent to the object; and
   a point on a line that forms a normal from the object.

6. The method of claim 1, wherein the step of acquiring the data point after the cursor remains near the data point for an acquisition pause time comprises the step of acquiring the data point after the cursor remains within an acquisition distance of the data point for an acquisition pause time.

7. The method of claim 6, wherein the acquisition distance is determined according to a parameter selected from a group comprising
   magnification of a view of the object; and
   an object type.

8. The method of claim 1, further comprising the step of annotating the acquired data point with an acquisition indicator.

9. The method of claim 1, further comprising the step of unacquiring the data point after the cursor remains near the acquired data point for an unacquisition pause time.

10. The method of claim 1, further comprising the steps of:
    accepting a command to move the cursor away from near the data point;
    accepting a command to move the cursor near the data point; and
    unacquiring the data point after the cursor remains near the data point for the unacquisition pause time.

11. The method of claim 10, wherein the unacquisition pause time is a different value than the acquisition pause time.

12. The method of claim 1, further comprising the steps of:
    accepting a command to move the cursor near a second data point on a second object;
    acquiring the second data point after the cursor remains near the second data point for the acquisition pause time; and
    aligning the first object and the second object according to the acquired first data point and the acquired second data point.

13. An apparatus for acquiring a data point of interest on a drawing object, comprising:
    means for accepting a command to move a cursor near the data point of the drawing object in a computer-implemented drawing program; and
    means for acquiring the data point after the cursor remains near the data point for an acquisition pause time.

14. The apparatus of claim 13, wherein the pause time is user-selectable.

15. The apparatus of claim 13, wherein the object is a linear entity.

16. The apparatus of claim 15, further comprising means for accepting a command to move the cursor away from the data point to extend the linear entity.

17. The apparatus of claim 13, wherein the data point is selected from the group comprising:
    an endpoint;
    a midpoint;
    a node;
    a closest quadrant point;
    an insertion point;
    a point on a line tangent to the object; and
    a point on a line that forms a normal from the object.

18. The apparatus of claim 13, wherein the means for acquiring the data point after the cursor remains near the data point for an acquisition pause time comprises the step of acquiring the data point after the cursor remains within an acquisition distance of the data point for an acquisition pause time.

19. The apparatus of claim 18, wherein the acquisition distance is determined according to a parameter selected from a group comprising;
    magnification of a view of the object; and
    an object type.

20. The apparatus of claim 13, further comprising means for annotating the acquired data point with an acquisition indicator.

21. The apparatus of claim 13, further comprising means for unacquiring the data point after the cursor remains near the acquired data point for an unacquisition pause time.

22. The apparatus of claim 13, further comprising:
means for accepting a command to move the color away from near the data point;
means for accepting a command to move the cursor near the data point; and
means for unacquiring the data point after the cursor remains near the data point for the unacquisition pause time.

23. The apparatus of claim 13, further comprising:
means for accepting a command to move the cursor near a second data point on a second object;
means for acquiring the second data point after the cursor remains near the second data point for the acquisition pause time; and
means for aligning the first object and the second object according to the acquired first data point and the acquired second data point.

24. A program storage device, readable by a computer, tangibly embodying at least one program of instructions executable by the computer in a drawing program to perform method steps of acquiring a data point of interest on a drawing object, the method comprising the steps of:
accepting a command to move a cursor near the data point of interest on the drawing object; and
acquiring the data point after the cursor remains near the data point for an acquisition pause time.

25. The program storage device of claim 24, wherein the pause time is user-selectable.

26. The program storage device of claim 24, wherein the object is a linear entity.

27. The program storage device of claim 26, wherein the method steps further comprise the step of accepting a command to move the cursor away from the data point to extend the linear entity.

28. The program storage device of claim 24, wherein the data point is selected from the group comprising:
an endpoint;
a midpoint;
a node;
a closest quadrant point;
an insertion point;
a point on a line tangent to the object; and
a point on a line that forms a normal from the object.

29. The program storage device of claim 24, wherein the method step of acquiring the data point after the cursor remains near the data point for an acquisition pause time comprises the step of acquiring the data point after the cursor remains within an acquisition distance of the data point for an acquisition pause time.

30. The program storage device of claim 29, wherein the acquisition distance is determined according to a parameter selected from a group comprising:
magnification of a view of the object; and
an object type.

31. The program storage device of claim 24, when the method steps further comprise the method step of annotating the acquired data point with an acquisition indicator.

32. The program storage device of claim 24, wherein the method steps further comprise the step of unacquiring the data point after the cursor remains near the acquired data point for an unacquisition pause time.

33. The program storage device of claim 24, wherein the method steps further comprise the steps of:
accepting a command to move the cursor away from near the data point;
accepting a command to move the cursor near the data point; and
unacquiring the data point after the cursor remains near the data point for the unacquisition pause time.

34. The program storage device of claim 24, wherein the method steps further comprise the steps of:
accepting a command to move the cursor near a second data point on a second object;
acquiring the second data point after the cursor remains near the second data point for the acquisition pause time; and
aligning the first object and the second object according to the acquired first data point and the acquired second data point.

35. A method of unacquiring an acquired data point, comprising the steps of:
accepting a command to move a cursor near the acquired data point of a drawing object in a computer-implemented drawing program; and
unacquiring the data point after the cursor remains near the acquired data point for an unacquisition pause time.

36. A method of acquiring a data point of interest on a drawing object, comprising the steps of:
accepting a modifier command; and
acquiring the data point of interest on a drawing object in a computer-implemented drawing program after a command is received to move a cursor near the data point, wherein the data point is not acquired without the modifier command; wherein the data point is acquired after the cursor remains near the data point for an acquisition pause time.

37. The method of claim 36 wherein the modifier command comprises the depression of a keyboard key.

* * * * *

UNITED STATES PATENT AND TRADEMARK OFFICE
CERTIFICATE OF CORRECTION

PATENT NO. : 7,098,933 B1  
APPLICATION NO. : 09/256896  
DATED : August 29, 2006  
INVENTOR(S) : Alexander Thoemmes et al.

Page 1 of 1

It is certified that error appears in the above-identified patent and that said Letters Patent is hereby corrected as shown below:

In the Claims

Column 11, line 8, Claim 22, please delete the word "color" and replace with the word --cursor--.

Signed and Sealed this
Twentieth Day of May, 2014

Michelle K. Lee
*Deputy Director of the United States Patent and Trademark Office*